US008676791B2

(12) United States Patent
Maedera et al.

(10) Patent No.: US 8,676,791 B2
(45) Date of Patent: Mar. 18, 2014

(54) APPARATUS AND METHODS FOR PROVIDING ASSISTANCE IN DETECTING MISTRANSLATION

(75) Inventors: Masahiko Maedera, Saitama (JP); Takaaki Shiratori, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 140 days.

(21) Appl. No.: 13/125,139

(22) PCT Filed: Nov. 13, 2009

(86) PCT No.: PCT/JP2009/069316
§ 371 (c)(1), (2), (4) Date: Apr. 20, 2011

(87) PCT Pub. No.: WO2010/061733
PCT Pub. Date: Jun. 3, 2010

(65) Prior Publication Data
US 2011/0202518 A1    Aug. 18, 2011

(30) Foreign Application Priority Data
Nov. 27, 2008   (JP) ................................ 2008-302585

(51) Int. Cl.
*G06F 7/00* (2006.01)
*G06F 17/30* (2006.01)

(52) U.S. Cl.
USPC .......................................... 707/723; 707/741

(58) Field of Classification Search
None
See application file for complete search history.

(56) References Cited

U.S. PATENT DOCUMENTS

| 5,510,981 | A | * | 4/1996 | Berger et al. ...................... 704/2 |
| 7,318,021 | B2 | * | 1/2008 | Itoh et al. .......................... 704/5 |
| 7,475,005 | B2 | | 1/2009 | Itoh et al. |
| 7,769,578 | B2 | * | 8/2010 | Itoh et al. .......................... 704/5 |
| 2007/0130112 | A1 | * | 6/2007 | Lin ................................... 707/2 |
| 2013/0066862 | A1 | * | 3/2013 | Orr et al. ....................... 707/728 |

FOREIGN PATENT DOCUMENTS

| CN | 1110882 A | 10/1995 |
| CN | 101079028 A | 11/2007 |
| CN | 101154221 A | 4/2008 |
| CN | 101520779 A | 9/2009 |

(Continued)

OTHER PUBLICATIONS

Moa, "Search Engines and Lingiustics—With a Case Study of an AUtomated Compound Translator Using Search", Thesis, Available Online at: http://www.bibsonomy.org/url/ 19ad96f4cd1d66435f2bc65a735 as of Mar. 2008.*

(Continued)

Primary Examiner — Michael Hicks
(74) Attorney, Agent, or Firm — Mollborn Patents, Inc.; Fredrik Mollborn

(57) ABSTRACT

Methods and apparatus, including computer program products, for providing assistance in detecting mistranslation in a translated document obtained by performing machine translation of an original document. A word included in the translated document is obtained. Search results are obtained of searching both a first document data group and a second document data group including the first document data group for pieces of document data related to the obtained word. Based on the obtained search results, an index is generated. The index indicates the adequacy of the obtained word as a translated word in a field corresponding to the first document data group. The generated index is output.

16 Claims, 13 Drawing Sheets

(56) References Cited

FOREIGN PATENT DOCUMENTS

| JP | 2002259375 A2 | 9/2002 |
| --- | --- | --- |
| JP | 2004280574 A2 | 10/2004 |
| JP | 2006276915 A2 | 10/2006 |
| JP | 2006318202 A2 | 11/2006 |
| JP | 2008123234 A2 | 5/2008 |

OTHER PUBLICATIONS

Moa, "Compounds and Other Oddities in Machine Translation", Proceedings of the 15th NODALIDA Conference, pp. 124-132, 2005.*

Way et al., "wEMBT: Developing and Validating an Example-Based Machine Translation System Using the World Wide Web", Computational Linguistics, vol. 29, No. 3, pp. 421-457, 2003, Association for Computational Linguistics.*

Grefenstette, The World Wide Web as a Resource for Example-Based Machine Translation Tools, Proceedings of Translating and Computer 21, 1999.*

Kraaij et al., "Embedding Web-Based Statistical Translation Models in Cross-Language Information Retrieval", Journal Computational Linguistics—Special issue on web as corpus archive, vol. 29, Issue 3, Sep. 2003, pp. 381-419, ACM.*

Lu et al., "Using Web Resources to construct multilingual medical thesaurus for cross-language medical information retrieval", Decision Support Systems 45, pp. 585-595, Elsevier, 2008.*

International Search Report. International Application No. PCT/JP2009/069316. Date of the actual completion of the international search Feb. 2, 2010.

* cited by examiner

FIG. 2

|  | EXACTLY MATCHING PAGES | COOCCURRENCE MATCHING PAGES |
|---|---|---|
| SPECIFIC SITE | α | β |
| ALL SITES | γ | δ |

http://search.aaa.co.jp/search?p=%22XYZ%22&
ei=UTF-8&fr=top_ga1&n=10&fl=0&x=wrt&vs=ibm.com (b)

http://search.aaa.co.jp/search?p=XYZ&
ei=UTF-8&fr=top_ga1&n=10&fl=0&x=wrt&vs=ibm.com (c)

http://search.aaa.co.jp/search?p=%22XYZ%22&
ei=UTF-8&fr=top_ga1&x=wrt (d)

http://search.aaa.co.jp/search?p=XYZ&
ei=UTF-8&fr=top_ga1&x=wrt

FIG. 9

| COMPOUND WORD | α | β | γ | δ | β / δ |
|---|---|---|---|---|---|
| Opun sosu<br>(OPEN SOURCE) | 3,830 | 5,610 | 30,000,000 | 43,000,000 | 0.0001305 |
| Gunshuu houhou<br>(COMMUNITY METHOD) | 0 | 0 | 3 | 3 | 0.0000000 |
| Apurikeshonn sekyuritei mondai<br>(APPLICATION SECURITY PROBLEM) | 0 | 5,790 | 0 | 15,700,000 | 0.0003688 |
| Webu sabisu<br>(WEB SERVICE) | 56 | 1,310 | 8,890,000 | 135,000,000 | 0.0000097 |
| Sabisu shikou<br>(SERVICE ORIENTED) | 1,690 | 4,080 | 619,000 | 6,650,000 | 0.0006135 |
| Multicore kasoku<br>(MULTICORE ACCELERATION) | 0 | 119 | 0 | 1,140 | 0.1043860 |
| Douteki baindeingu<br>(DYNAMIC BINDING) | 12 | 320 | 700 | 109,000 | 0.0029358 |
| Bijinesu wakufuro sutorakutya<br>(BUSINESS WORKFLOW STRUCTURE) | 0 | 485 | 0 | 94,900 | 0.0051106 |
| Otonomikku konpyuteingu<br>(AUTONOMIC COMPUTING) | 2,350 | 2,560 | 53,200 | 66,600 | 0.0384384 |
| toresabiritei<br>(TRACEABILITY) | 103 | 1,970 | 71,400 | 8,190,000 | 0.0002405 |
| Rashonaru timu konsato<br>(RATIONAL TEAM CONCERT) | 0 | 0 | 0 | 36 | 0.0000000 |
| Komyunitei ryoiki<br>(COMMUNITY AREA) | 0 | 889 | 5 | 5,370,000 | 0.0001655 |

In each cell of the COMPOUND WORD column,
An upper row shows an English-to-Japanese machine translation result in Roman-ji.
A lower row inside parentheses shows an original English text.

FIG. 11

| LEVEL | COMPOUND WORD |
|---|---|
| A1 | Douteki baindeingu (DYNAMIC BINDING), Otonomikku konpyuteingu (AUTONOMIC COMPUTING) |
| A2 | Opun sosu (OPEN SOURCE), Webu sabisu (WEB SERVICE), Sabisu shikou (SERVICE ORIENTED), toresabiritei (TRACEABILITY) |
| B | Komyunitei ryoiki (COMMUNITY AREA) |
| C1 | Multicore kasoku (MULTICORE ACCELERATION) |
| C2 | Bijinesu wakufuro sutorakutya (BUSINESS WORKFLOW STRUCTURE) |
| C3 | Apurikeshonn sekyuritei mondai (APPLICATION SECURITY PROBLEM) |
| D | Gunshuu houhou (COMMUNITY METHOD), Rashonaru timu konsato (RATIONAL TEAM CONCERT) |

APPARATUS AND METHODS FOR PROVIDING ASSISTANCE IN DETECTING MISTRANSLATION

CROSS-REFERENCE TO RELATED APPLICATIONS

This application is a National Phase Application of PCT application No. JP2009/069316, which was filed on Nov. 13, 2009, and entitled "Verification to detect suspicious words in Japanese translation based on Japanese morphological Analysis results", which, in turn, claims priority to Japanese Patent Application No. 2008-302585, filed on Nov. 27, 2008. Both of these applications are incorporated herein by reference in their entirety.

TECHNICAL FIELD

The present invention relates to apparatuses and methods for providing assistance in document translations, and more specifically to apparatuses and methods for providing assistance in detecting mistranslation in a translated document obtained by performing machine translation of an original document.

BACKGROUND

Recently, with the increasing globalization of business, information is available on the Internet in many different languages. In many cases, the original information is provided in English and translated into other languages. In general, specialists perform the translation. Recently, the amount of provided information has increased steadily. Thus, the translation by specialists does not keep pace with the increase in the amount of provided information.

Information obtained by translating information in English into another language by machine translation, using a machine translation server, is increasingly provided to solve such a problem. However, the following problems exist in machine translation.

First, since software cannot infer the context, it is hard to select translated words suitable for the context. Second, since manual operation is necessary to check whether appropriate translated words are used, it takes much time to check increasing information, so that customers who need the information experience a decreased level of satisfaction. Various techniques have been proposed for improving the efficiency of, for example, checking and correcting mistranslations that occur in machine translation.

In Japanese Unexamined Patent Application Publication No. 2008-123234, a translated document obtained by translating each original document by machine translation is stored. At the same time, a corrected translated document obtained by correcting mistranslation included in the translated document is received from a user's terminal and stored. Then, when a request for a document has been received from a user's terminal, a specified original document and a corresponding corrected translated document are sent to the user's terminal.

In Japanese Unexamined Patent Application Publication No. 2006-318202, a translated text in a second natural language that is translated from each original text in a first natural language and a reversely translated text in the first natural language that is translated from the translated text are displayed in association with the original text. Then, in response to a request from a user, a candidate translated word is selected from a list of candidate translated words in the second natural language corresponding to the morphemes of the original text, and the translated text and the reversely translated text are re-generated, using the selected translated word as the translated word of a corresponding one of the morphemes.

In Japanese Unexamined Patent Application Publication No. 2006-276915, when a user has added an annotation corresponding to a desired edit method to each place to be edited in a translated text and fixed the annotation, the place of a target translated word to which each annotation is added is edited, following an edit method corresponding to the type of the annotation.

Techniques for improving the efficiency of, for example, detection and correction of mistranslation that occurs in machine translation have been provided, as described above. However, these techniques do not provide means for efficiently detecting words considered unsuitable as translated words in a specific field.

SUMMARY

According to one aspect of the present invention, methods and apparatus, including computer program products, are provided for assisting in the detection of mistranslations in a translated document obtained by performing machine translation of an original document. A word included in the translated document is obtained. Search results are obtained of searching both a first document data group and a second document data group including the first document data group for pieces of document data related to the obtained word. Based on the obtained search results, an index is generated. The index indicates the adequacy of the obtained word as a translated word in a field corresponding to the first document data group. The generated index is output.

The details of one or more embodiments of the invention are set forth in the accompanying drawings and the description below. Other features and advantages of the invention will be apparent from the description and drawings, and from the claims.

DESCRIPTION OF DRAWINGS

A preferred embodiment of the present invention will now be described, by way of example only, with reference to the accompanying drawings, in which:

FIG. 2 shows the respective definitions of symbols used in the embodiment of the present invention;

FIG. 8 shows exemplary search queries used by the search request unit in the client in the embodiment of the present invention;

FIG. 9 shows exemplary content stored in a search result storage unit in the client in the embodiment of the present invention;

FIG. 11 shows exemplary content stored in an evaluation information storage unit in the client in the embodiment of the present invention;

Figure 1:
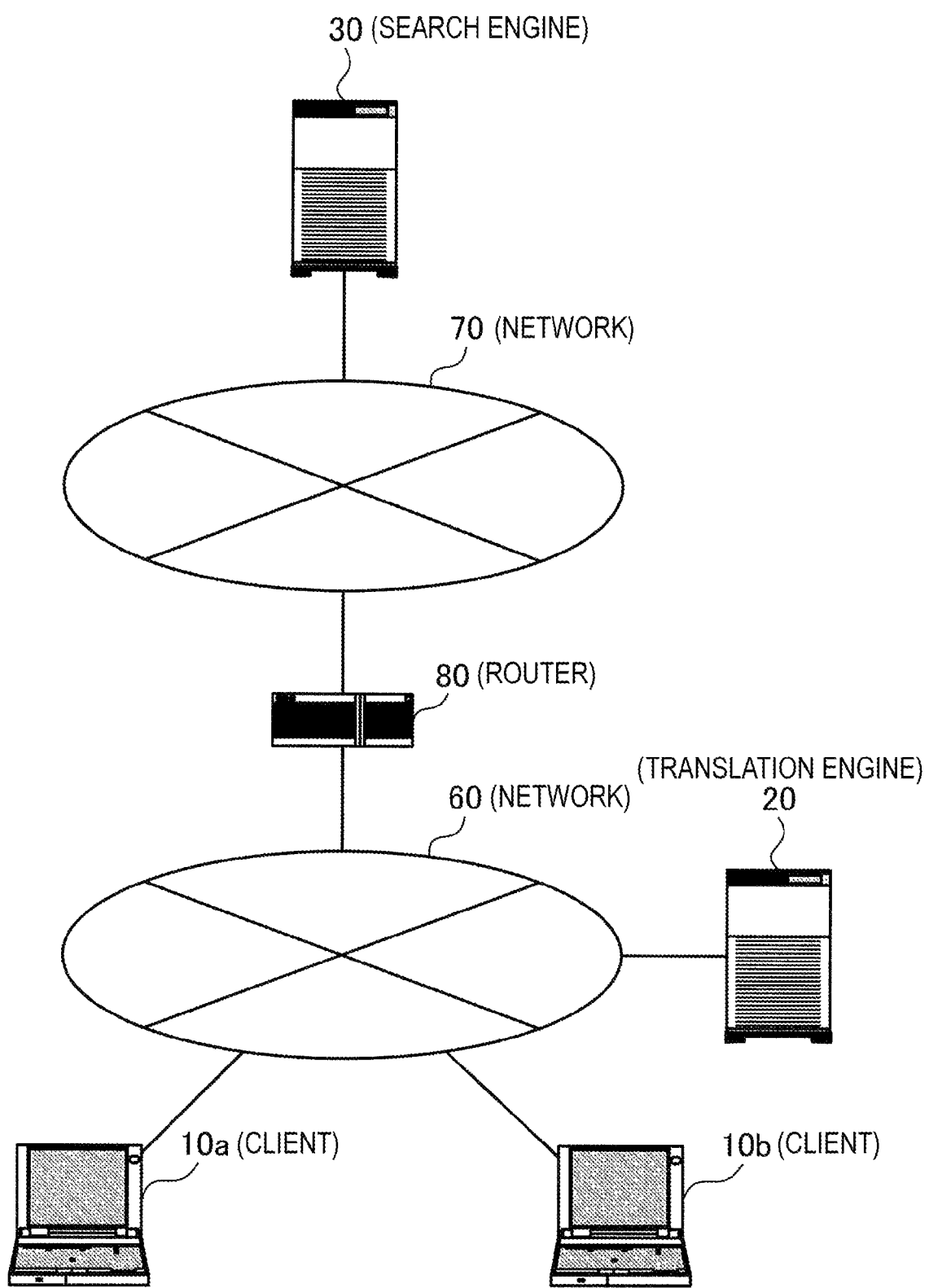
FIG. 1 is a diagram showing the overall configuration of a computer system in an embodiment of the present invention.

The reference numerals found in the drawings are to be interpreted according to the following list:

10: client
11: translation request unit
12: translated document storage unit
13: morphological analysis unit
14: compound word list storage unit
15: search request unit
16: search result storage unit
17: evaluation unit
18: evaluation information storage unit
19: dictionary update unit
20: translation engine
30: search engine Like reference numerals in the various drawings indicate like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to FIG. 1, a computer system to which the embodiment is applied will first be described. FIG. 1 is a diagram showing an exemplary overall configuration of such a computer system in accordance with one embodiment.

The computer system is configured in a manner in which clients 10a and 10b and a translation engine 20 are connected to a network 60, a search engine 30 is connected to a network 70, and the networks 60 and 70 are connected to each other via a router 80, as shown in the drawing.

Each of the clients 10a and 10b is a terminal unit such as a personal computer (PC) used by a user. In particular, a web browser is installed in each of the clients 10a and 10b, and each of the clients 10a and 10b displays a web page (hereinafter called a page) provided by the translation engine 20, using the web browser, indicates to the translation engine 20 from the page to translate a specified original document (a document that has not been subjected to translation), and displays a translated document (a document that has been subjected to translation) returned from the translation engine 20 on the page. The drawing shows the clients 10a and 10b. However, when the clients 10a and 10b need not be distinguished from each other, the clients 10a and 10b may be called clients 10. Although the drawing shows only the two clients 10, three or more clients 10 may be provided.

The translation engine 20 is an engine that translates a document described in one language to a document described in another language by software and represents what is called a translation server. In particular, in the embodiment, it is assumed that the translation engine 20 is a translation engine that performs translation specific to a field in which a specific organization (for example, an enterprise) connected to the translation engine 20 via the network 60 is involved.

An example of the search engine 30 is a robot type search engine in which a crawler automatically accesses pieces of content in the Internet, following hyperlinks (links), to accumulate the index information of the pieces of content, and a response is returned in response to a search request from a client. Alternatively, the search engine 30 may be a directory type search engine in which an administrator registers each piece of content in an appropriate directory, and when a search request has been sent from a client, the search results are returned on the basis of the registered information.

The networks 60 and 70 are communication means used to send and receive various types of data. In the embodiment, an intranet that is a network in a specific organization has assumed as the network 60. Moreover, the Internet, which includes networks extending outside of the specific organization, is assumed as the network 70.

The router 80 is a device that relays, for example, data that the network 60 sends to the network 70 and data that the network 60 receives from the network 70.

In the computer system including such a configuration, the embodiment proposes a method for efficiently improving the quality of the result of translating technical information provided in English to Japanese by machine translation.

When information in English is translated to Japanese by machine translation, a result that is grammatically correct as Japanese but includes terms unsuitable for the context may be obtained. For example, the terms are suitable as translated words in a general field but unsuitable as translated words in a specific field. In many case, such a situation occurs regarding the translated words of compound words.

Hitherto, an operation of detecting mistranslation in such a case has been performed by a human visually checking mistranslation. However, mistranslation in machine translation occurs due to various problems including problems about terms and problems about, for example, the structures of texts and determination of formats. Thus, in such an operation, the efficiency cannot be improved. Thus, in the embodiment, the probability that a compound word included in the result of translation is a mistranslated word (hereinafter called the probability of mistranslation) is digitized and presented to users. In this arrangement, an operation of detecting mistranslation can be quickly performed, and the quality of machine translation can be efficiently improved.

Specifically, an Internet search is performed to check the number of pages of each of the following four types, out of pages related to each compound word adopted as a translated word. Then, the probability of mistranslation is digitized on the basis of these numbers of pages.
1. Exactly matching pages at a specific site
2. Co-occurrence matching pages at a specific site
3. Exactly matching pages at all sites
4. Co-occurrence matching pages at all sites In this case, it is assumed that a specific site and all sites are sites that include only Japanese documents. Moreover, it is preferable that each of the Japanese documents be not a document obtained by machine translation but be a document described by a person conversant in Japanese. This is because, when a document serving as a basis for verification of the probability of mistranslation includes mistranslation, the reliability of an obtained probability of mistranslation decreases.

An exactly matching page represents a page including a word that exactly matches a compound word. When a compound word is specified as a search term, with the compound word being placed in quotes, some search engines search such a page.

Moreover, a co-occurrence matching page represents a page including all of the plurality of words (constituent words) obtained by breaking down a compound word. When a compound word is specified as a search term, with the compound word not being placed in quotes, some search engines search such a page, automatically breaking down the compound word into words. For example, a compound word "Uchuu rantaimu" (Japanese) is considered as machine translation of "COSMOS runtime". In this case, co-occurrence matching pages, i.e., pages that may not include the compound word "Uchuu rantaimu" but include both "Uchuu" and "Rantaimu", are searched by breaking down "Uchuu rantaimu" to "Uchuu" and "Rantaimu" and searching for "Uchuu" and "Rantaimu".

FIG. 2 defines symbols representing the numbers of pages of the aforementioned four types. In the embodiment, it is assumed that the number of exactly matching pages at a specific site is "$\alpha$", the number of co-occurrence matching pages at a specific site is "$\beta$", the number of exactly matching pages at all sites is "$\gamma$", and the number of co-occurrence matching pages at all sites is "$\delta$", as shown in the drawing.

When the aforementioned definitions are provided, the following conditional expressions hold:

$$\alpha \leq \beta \leq \delta$$

$$\alpha \leq \gamma \leq \delta$$

In this case, the relationship between $\beta$ and $\gamma$ in terms of size is indeterminate but useful for analyzing the technicality of a site.

In one embodiment, a compound word is used as an exemplary word, a page is used as exemplary document data, a specific site is used as an exemplary first document data group, and all sites are used as an exemplary second document data group. Moreover, $\alpha$ or $\beta$ is used as an exemplary first value indicating the number of pieces of document data related to a word in the first document data group, and $\gamma$ or $\delta$ is used as an exemplary second value indicating the number of pieces of document data related to a word in the second document data group. Moreover, β is used as an exemplary first value indicating the number of pieces of document data including a plurality of constituent words obtained by searching the first document data group for the pieces of document data, δ is used as an exemplary second value indicating the number of pieces of document data including a plurality of constituent words obtained by searching the second document data group for the pieces of document data, α is used as an exemplary third value indicating the number of pieces of document data including a compound word obtained by searching the first document data group for the pieces of document data, and γ is used as an exemplary fourth value indicating the number of pieces of document data including a compound word obtained by searching the second document data group for the pieces of document data. A method for evaluating the probability of mistranslation in accordance with one embodiment will next be described, taking five compound words W1 to W5 as examples.

Figure 3:
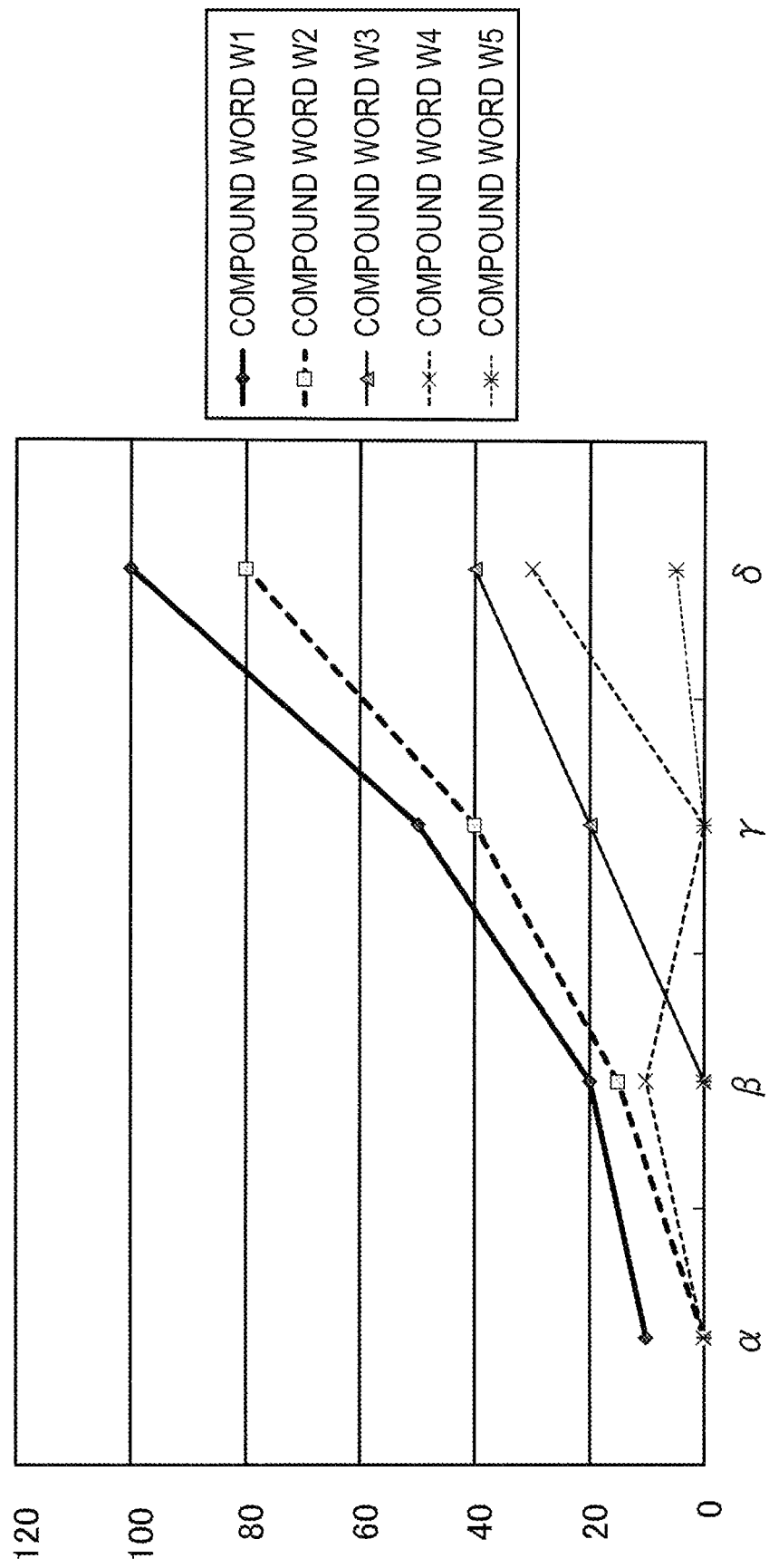
FIG. 3 is a graph showing evaluation of compound words in the embodiment of the present invention.

FIG. 3 is a graph showing the respective values of α, β, γ, and δ for each of the compound words W1 to W5. Regarding the compound word W1, since the value of α is somewhat large, it can be found that many exactly matching pages exist in a specific site. Thus, it can be said that the compound word W1 is a correct translated word at the specific site.

Regarding the compound word W2, since both the value of β and the value of γ are equal to or more than a predetermined value, it can be found that and a rather large number of co-occurrence matching pages exist in the specific site and a rather large number of exactly matching pages exist in all sites. Thus, it can be said that the probability that the compound word W2 is a correct Japanese word and a correct translated word is high.

Regarding the compound word W3, since, although the value of α and the value of β are close to zero, the value of γ is equal to or more than the predetermined value, it can be found that, although few exactly matching pages and few co-occurrence matching pages exist in the specific site, a rather large number of exactly matching pages exist in all sites. Thus, it can be said that the probability that the compound word W3 is a correct Japanese word but unsuitable in the specific site is high. Regarding such a compound word, it is advised to adopt an arrangement in which, for example, the value of α/γ is obtained, and when the value of α/γ is equal to or less than a predetermined threshold value, it is determined that the compound word is unsuitable as a translated word at the specific site. Alternatively, similar determination may be made using the value of β/γ. Alternatively yet, determination may be made on the basis of any criterion, as long as the determination is based on the result of comparing at least one of α and β with at least one of γ and δ.

Regarding the compound word W4, since the value of γ is zero, it can be found that no exactly matching page exists in all sites. Thus, it can be said that re-verification of whether the compound word W4 is a correct Japanese word is necessary.

Regarding the compound word W5, since the value of γ is zero and the value of δ is close to zero, it can be found that no exactly matching page and few co-occurrence matching pages exist in all sites. Thus, it can be said that the compound word W5 is unsuitable as a Japanese word.

In this case, regarding each of the compound words W2, W3, and W4, the value of β/δ may be further calculated, and it may be determined that, the smaller the value of β/δ is, the higher the probability of mistranslation is.

As is apparent from the foregoing description, in the embodiment, an Internet search that is originally performed using an actual word as a search key is used to detect words that do not actually exist.

The clients 10 in the embodiment will next be described in detail. In the following description, it is assumed that a Japanese translated document is obtained by performing machine translation of an original document described in English, and mistranslation is verified. However, the respective languages of an original document and a translated document are not limited to these languages. The functional configuration of each of the clients 10 will first be described.

Figure 4:
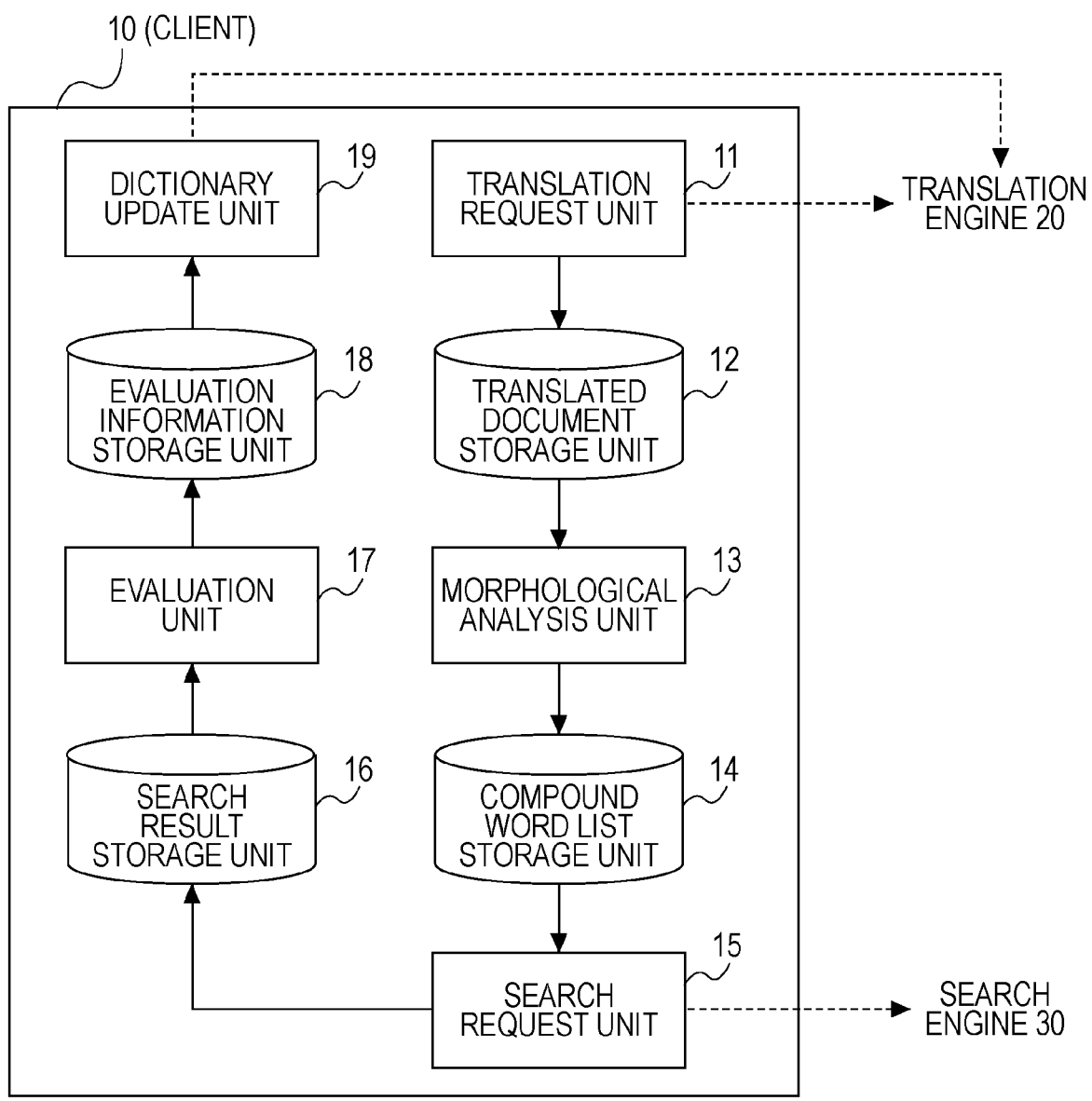
FIG. 4 is a diagram showing an exemplary functional configuration of a client in the embodiment of the present invention.

FIG. 4 is a block diagram showing an exemplary functional configuration of the client 10, in accordance with one embodiment. The client 10 includes a translation request unit 11, a translated document storage unit 12, a morphological analysis unit 13, a compound word list storage unit 14, and a search request unit 15, as shown in the drawing. The client 10 further includes a search result storage unit 16, an evaluation unit 17, an evaluation information storage unit 18, and a dictionary update unit 19.

The translation request unit 11 transfers the specification of an English document by a user to the translation engine 20, indicates to the translation engine 20 to translate the English document to Japanese, and receives a Japanese document as a result of the translation by the translation engine 20.

The translated document storage unit 12 stores the Japanese document, which the translation request unit 11 has received from the translation engine 20.

The morphological analysis unit 13 performs morphological analysis on the Japanese document stored in the translated document storage unit 12 to extract compound words. In the embodiment, the morphological analysis unit 13 is provided as an exemplary first acquisition unit that obtains words.

The compound word list storage unit 14 stores a list of the compound words extracted by the morphological analysis unit 13 (a compound word list).

The search request unit 15 inputs, to the search engine 30, search queries for searching a specific site and all sites for pages related to the compound words stored in the compound word list storage unit 14 and receives the results of search by the search engine 30. In the embodiment, the search request unit 15 is provided as an exemplary second acquisition unit that obtains the search results of searching both of the first and second document data groups for pieces of document data related to words.

The search result storage unit 16 stores the search results, which the search request unit 15 has received from the search engine 30.

The evaluation unit 17 generates, on the basis of the search results stored in the search result storage unit 16, evaluation information indicating the probability of mistranslation for each compound word (information on the level of each compound word). In the embodiment, evaluation information is used as an exemplary index indicating the adequacy of a word as a translated word in a field corresponding to the first document data group, and the evaluation unit 17 is provided as an exemplary generation unit that generates such an index.

The evaluation information storage unit 18 stores the evaluation information generated by the evaluation unit 17.

The dictionary update unit 19 updates a dictionary to which the translation engine 20 refers when performing machine translation. At this time, the evaluation information stored in the evaluation information storage unit 18 may be presented to a user, and the user may be requested to indicate to the dictionary update unit 19 whether to update the dictionary regarding each compound word. The operation according to the embodiment will next be described in detail.

It is assumed that a user first has caused a page provided by the translation engine 20 to be displayed on the client 10 and has specified, on the page, an English document to be translated. Then, in the client 10, the translation request unit 11 starts the operation.

Figure 5:
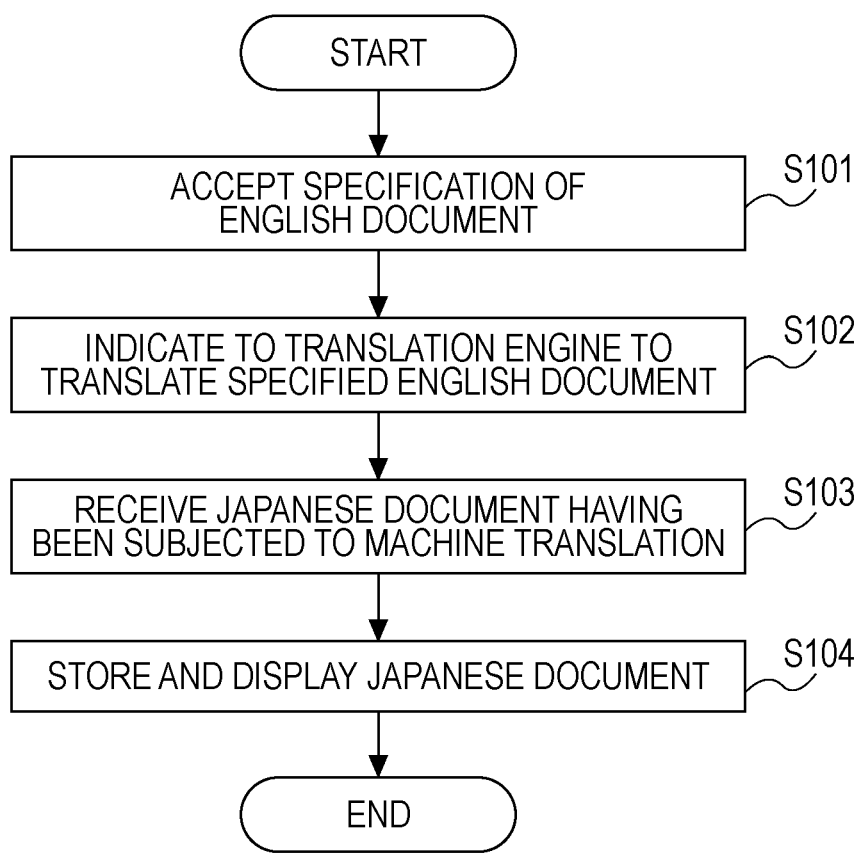
FIG. 5 is a flowchart showing an exemplary operation of a translation request unit in the client in the embodiment of the present invention.

FIG. 5 is a flowchart showing an exemplary operation of the translation request unit 11 in this case and in accordance with one embodiment. The translation request unit 11 first accepts the specification of the English document to be translated by the user (step 101). In this case, the English document to be translated may be a page in the Internet or an electronic document created by a specific application and stored in the client 10.

Then, the translation request unit 11 indicates to the translation engine 20 to translate the specified English document (step 102). Then, the translation engine 20 performs machine translation of the English document to obtain a Japanese document.

Thus, the translation request unit 11 receives, from the translation engine 20, the Japanese document obtained by the machine translation (step 103). Then, the received Japanese document is stored in the translated document storage unit 12 and displayed on a display unit 90*d* (refer to FIG. 13) (step 104).

When the Japanese document has been stored in the translated document storage unit 12 in this manner, the morphological analysis unit 13 performs morphological analysis on the Japanese document to extract compound words to be verified for the probability of mistranslation.

Figure 6:
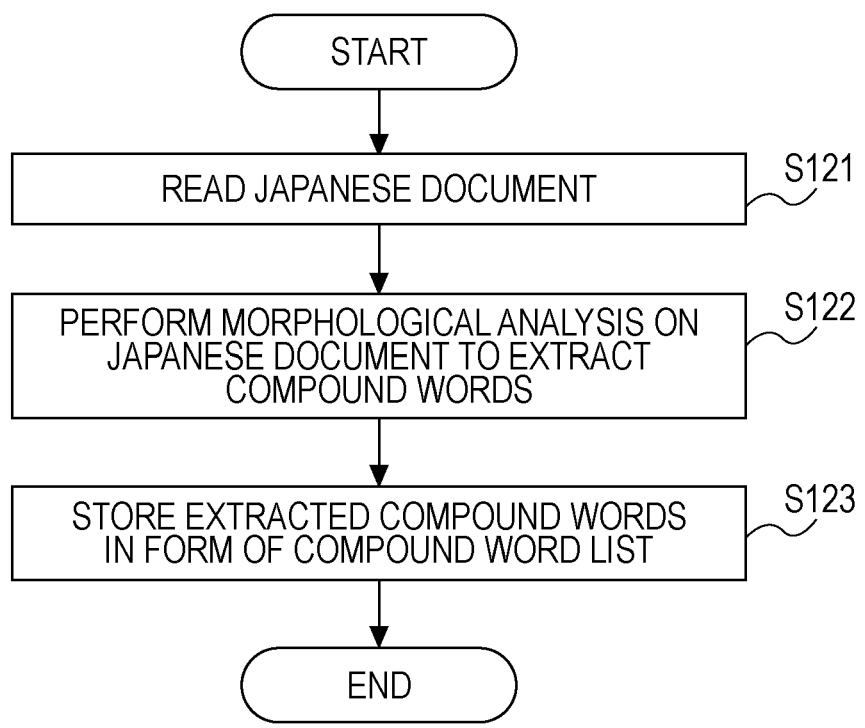
FIG. 6 is a flowchart showing an exemplary operation of a morphological analysis unit in the client in the embodiment of the present invention.

FIG. 6 is a flowchart showing an exemplary operation of the morphological analysis unit 13 in this case and in accordance with one embodiment. The morphological analysis unit 13 first reads the Japanese document obtained by the machine translation from the translated document storage unit 12 (step 121).

Then, the morphological analysis unit 13 performs morphological analysis on the Japanese document to extract compound words (step 122). In this case, the number of compound words to be extracted is not limited to one. In general, a plurality of compound words is extracted.

Then, the morphological analysis unit 13 stores the extracted compound words in the form of a compound word list in the compound word list storage unit 14 (step 123). When the compound word list has been stored in the compound word list storage unit 14 in this manner, in the Internet, the search request unit 15 searches for pages related to the compound words included in the compound word list, using the search engine 30.

Figure 7:
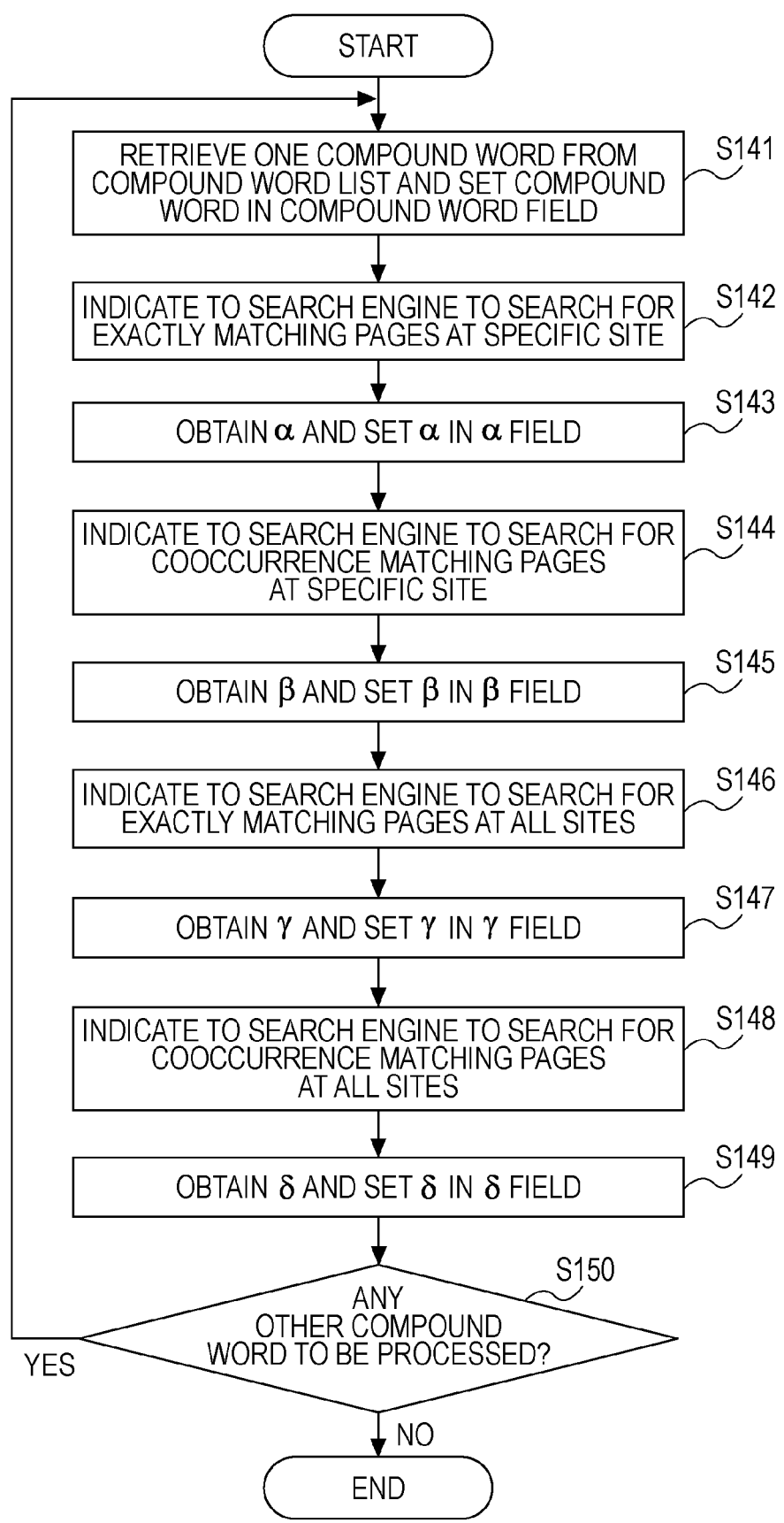
FIG. 7 is a flowchart showing an exemplary operation of a search request unit in the client in the embodiment of the present invention.

FIG. 7 is a flowchart showing an exemplary operation of the search request unit 15 in this case and in accordance with one embodiment. FIG. 8 shows exemplary search queries to be sent to the search engine 30 in the exemplary operation and in accordance with one embodiment.

The search request unit 15 first retrieves a compound word stored in the compound word list storage unit 14 and sets the compound word in a compound word field in the search result storage unit 16 (step 141). The storage format in the search result storage unit 16 will be described below in detail.

Then, the search request unit 15 indicates to the search engine 30 to search for exactly matching pages at a specific site (step 142). At this time, for example, the search request unit 15 sends a search query shown in FIG. 8 (*a*) to the search engine 30. In this search query, a compound word "XYZ" is placed in quotes (described as "%22" in the drawing) to be specified as a search term. Moreover, "ibm.com" is specified as a specific site by a description "vs=ibm.com". Then, the search engine 30 searches for exactly matching pages at the specific site and returns the number a of such pages to the client 10. Thus, the search request unit 15 obtains a from the search engine 30 and sets $\alpha$ in an $\alpha$ field in the search result storage unit 16 (step 143).

Furthermore, the search request unit 15 indicates to the search engine 30 to search for co-occurrence matching pages at the specific site (step 144). At this time, for example, the search request unit 15 sends a search query shown in FIG. 8 (*b*) to the search engine 30. In this search query, a compound word "XYZ" is specified as a search term, without being placed in quotes. Moreover, "ibm.com" is specified as a specific site by a description "vs=ibm.com". Then, the search engine 30 searches for co-occurrence matching pages at the specific site and returns the number $\beta$ of such pages to the client 10. Thus, the search request unit 15 obtains $\beta$ from the search engine 30 and sets $\beta$ in a $\beta$ field in the search result storage unit 16 (step 145).

Furthermore, the search request unit 15 indicates to the search engine 30 to search for exactly matching pages at all sites (step 146). At this time, for example, the search request unit 15 sends a search query shown in FIG. 8 (*c*) to the search engine 30. In this search query, a compound word "XYZ" is placed in quotes (described as "%22" in the drawing) to be specified as a search term. Moreover, a description "vs=" is not given, i.e., no specific site is specified. Then, the search engine 30 searches for exactly matching pages at all sites and returns the number $\gamma$ of such pages to the client 10. Thus, the search request unit 15 obtains $\gamma$ from the search engine 30 and sets $\gamma$ in a $\gamma$ field in the search result storage unit 16 (step 147).

Furthermore, the search request unit 15 indicates to the search engine 30 to search for co-occurrence matching pages at all sites (step 148). At this time, for example, the search request unit 15 sends a search query shown in FIG. 8 (*d*) to the search engine 30. In this search query, a compound word "XYZ" is specified as a search term, without being placed in quotes. Moreover, a description "vs=" is not given, i.e., no specific site is specified. Then, the search engine 30 searches for co-occurrence matching pages at all sites and returns the number $\delta$ of such pages to the client 10. Thus, the search request unit 15 obtains $\delta$ from the search engine 30 and sets $\delta$ in a $\delta$ field in the search result storage unit 16 (step 149).

Subsequently, the search request unit 15 determines whether any compound word that has not been processed is stored in the compound word list storage unit 14 (step 150). When such a compound word is stored, processing in steps 141 to 149 is repeated on the compound word. When such a compound word is not stored, the operation is completed. Search results stored in the search result storage unit 16 by the aforementioned operation will now be described.

FIG. 9 shows exemplary search results stored in the search result storage unit 16, in accordance with one embodiment. In the search results, each compound word, the value of $\alpha$, the value of $\beta$, the value of $\gamma$, and the value of $\delta$ are in association with each other, as shown in the drawing. In FIG. 9, the value of $\beta/\delta$ is also in association with these items. However, the value of $\beta/\delta$ is included in FIG. 9 for the sake of illustration and thus actually may not be stored in the search result storage unit 16. Moreover, FIG. 9 shows a state in which the information is stored, following the operation in FIG. 7, and the search results are stored in the order in which compound words occur in a Japanese document obtained by machine translation. It is shown that, for example, a compound word that occurs first in the Japanese document obtained by machine translation is "Opun sosu" (machine translation of open source"), 3,830 pages that include "Opun sosu" and 5,610 pages that include "Opun" and "sosu" exist at a specific site, and 30,000,000 pages that include "Opun sosu" and 43,000,000 pages that include "Opun" and "sosu" exist at all sites.

When the search results have been stored in the search result storage unit 16 in this manner, the evaluation unit 17 generates, on the basis of this information, evaluation information that represents the level of probability of mistranslation of each compound word.

Specifically, the evaluation unit 17 assesses the search results against the following four criteria obtained from an empirical rule and classifies the compound words adopted as translated words into "correct", "attention is required", and "correction is required".

A criterion assigned to a compound word when two or more corresponding exactly matching pages have been found at a specific site. A compound word assigned to this criterion can be regarded as a correct translated word at the specific site.

A criterion assigned to a compound word when, although two or more corresponding exactly matching pages have not been found at a specific site, two or more corresponding exactly matching pages have been found at all sites. A compound word classified into this criterion is substantially correct as a Japanese word. However, since the compound word may not be suitable at the specific site, attention is required.

A criterion assigned to a compound word when two or more corresponding exactly matching pages have not been found at a specific site and all sites. A compound word classified into this criterion may be a mistranslated word, and thus attention is required.

A criterion assigned to a compound word when none of the aforementioned conditions is met and when no corresponding co-occurrence matching page has been found at a specific site. Since the probability that a compound word classified into this criterion is a mistranslated word is high, correction is required.

Moreover, priorities for paying attention are assigned, by an evaluation equation, to compound words to which the criteria that require attention are assigned in the aforementioned operation. The ratio of the number of co-occurrence matching pages at a specific site to the number of co-occurrence matching pages at all sites is used as the evaluation equation. In other words, the ratio of the frequency of co-occurrence of a plurality of words that constitute a compound word to the frequency of occurrence in which these words occur in the same ordering as in the compound word is obtained.

The larger the value is, the higher the degree of the penetration of the compound word into the specific site is. Thus, the probability that the compound word is not a mistranslated word is high. The smaller the value is, the lower the degree of the penetration of the compound word into the specific site is. Thus, the probability that the compound word is a mistranslated word is high, and attention is required.

However, since the magnitude of the value varies with the type of a site specified as a specific site (for example, the type of a domain or a document), a criterion is divided into three levels, using the average value or a tenth of the average value as a threshold value, and is used as a guide for paying attention.

Figure 10:
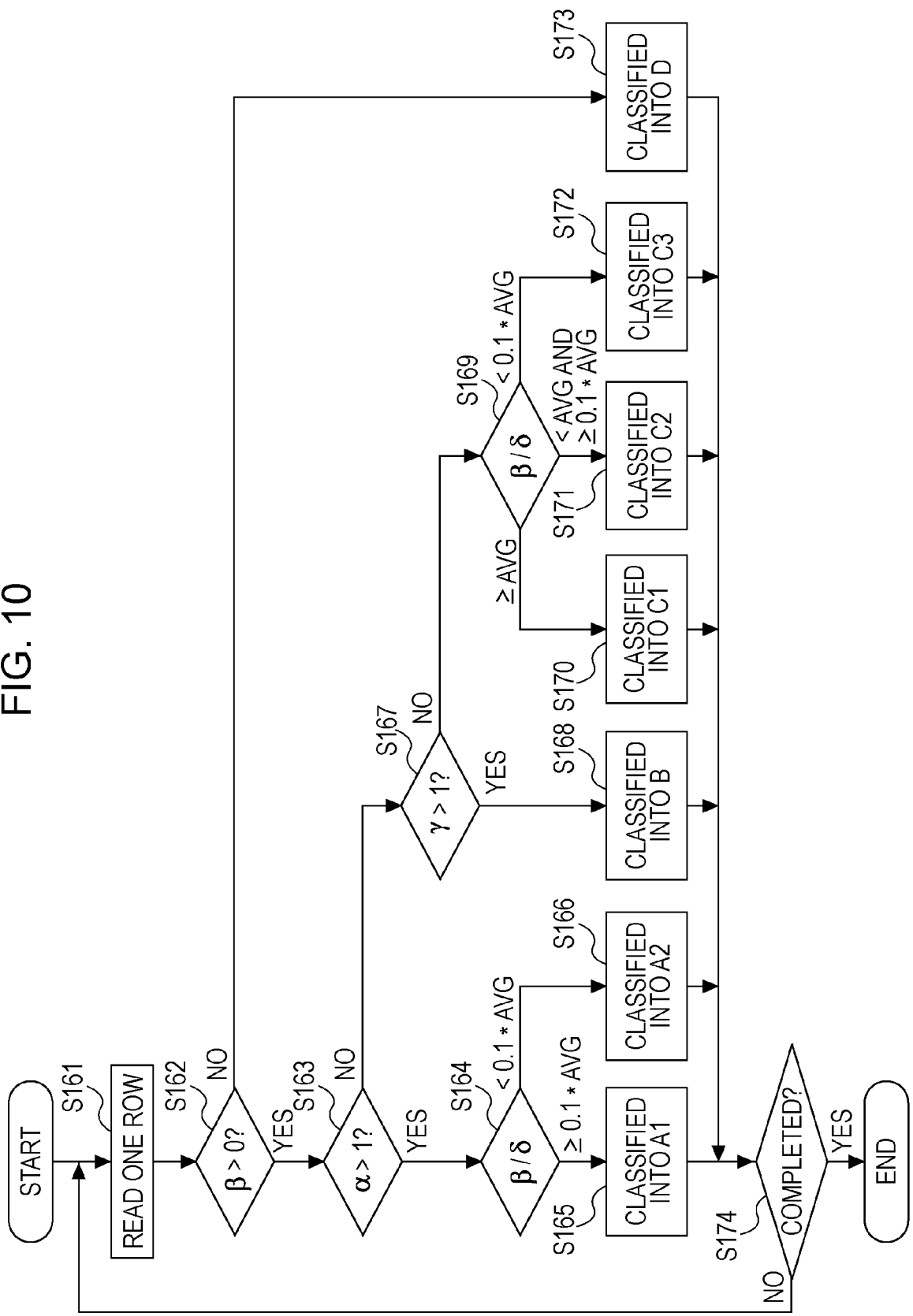
FIG. 10 is a flowchart showing an exemplary operation of an evaluation unit in the client in the embodiment of the present invention.

FIG. 10 is a flowchart showing an exemplary operation of the evaluation unit 17 generating evaluation information. In this exemplary operation, although the criterion A is not a criterion that requires attention, the criterion A is also divided into two levels using the evaluation equation. In this case, it is assumed that, prior to this operation, the average AVG of values $\beta/\delta$ for all compound words is obtained and stored in a memory to which the evaluation unit 17 can refer. For example, in the case of the example in FIG. 9, AVG= (0.0001305+0.0000000+0.0003688+0.0000097+ 0.0006135+0.1043860+0.0029358+0.0051106+0.0384384+ 0.0002405+0.0000000+0.0001655)/12=0.0126999. Thus, this value is stored in the memory.

The evaluation unit 17 first reads one row from the search results stored in the search result storage unit 16 (step 161). Then, the evaluation unit 17 determines whether the value of $\beta$ in the read search result exceeds zero (step 162). When the value of $\beta$ exceeds zero, the evaluation unit 17 determines whether the value of $\alpha$ in the read search result exceeds one (step 163).

As a result, when the value of $\alpha$ exceeds one, a compound word that is being processed is classified into a level A. However, in the embodiment, the level A is divided into a level A1 and a level A2 on the basis of the value of $\beta/\delta$. Thus, the compound word is classified into the level A1 or the level A2. Specifically, the evaluation unit 17 calculates $\beta/\delta$ from $\beta$ and $\delta$ in the read search result, reads AVG from the memory, and determines the relationship between $\beta/\delta$ and AVG×0.1 in terms of size (step 164). When $\beta/\delta$ is equal to or more than AVG×0.1, the compound word, which is being processed, is classified into the level A1 (step 165). Specifically, the compound word is stored in association with the level A1 in the evaluation information storage unit 18. When $\beta/\delta$ is less than AVG×0.1, the compound word, which is being processed, is classified into the level A2 (step 166). Specifically, the compound word is stored in association with the level A2 in the evaluation information storage unit 18.

On the other hand, when the value of $\alpha$ is equal to or less than one in step 163, the evaluation unit 17 determines whether the value of $\gamma$ in the search result read in step 161 exceeds one (step 167). When the value of $\gamma$ exceeds one, the evaluation unit 17 classifies the compound word, which is being processed, into a level B (step 168). Specifically, the compound word is stored in association with the level B in the evaluation information storage unit 18.

When the value of $\gamma$ is equal to or less than one, the compound word, which is being processed, is classified into a level C. However, in the embodiment, the level C is divided into a level C1, a level C2, and a level C3 on the basis of the value of $\beta/\delta$. Thus, the compound word is classified into the level C1, the level C2, or the level C3. Specifically, the evaluation unit 17 calculates $\beta/\delta$ from $\delta$ and $\delta$ in the read search result, reads AVG from the memory, and determines the relationship between $\beta/\delta$ and AVG and the relationship between $\beta/\delta$ and AVG×0.1 in terms of size (step 169). When $\beta/\delta$ is equal to or more than AVG, the compound word, which is being processed, is classified into the level C1 (step 170). Specifically, the compound word is stored in association with the level C1 in the evaluation information storage unit 18. When $\beta/\delta$ is less than AVG and is equal to or more than AVG×0.1, the compound word, which is being processed, is classified into the level C2 (step 171). Specifically, the compound word is stored in association with the level C2 in the evaluation information storage unit 18. When $\beta/\delta$ is less than AVG×0.1, the compound word, which is being processed, is classified into the level C3 (step 172). Specifically, the compound word is stored in association with the level C3 in the evaluation information storage unit 18.

When the value of $\beta$ is zero in step 162, the evaluation unit 17 classifies the compound word, which is being processed, into a level D (step 173). Specifically, the compound word is stored in association with the level D in the evaluation information storage unit 18.

Subsequently, the evaluation unit 17 determines whether any search result that has not been processed is stored in the search result storage unit 16 (step 174). When such a search result is stored, processing in steps 161 to 173 is repeated on the search result. When such a search result is not stored, the operation is completed. The evaluation information stored in the evaluation information storage unit 18 by the aforementioned operation will now be described.

FIG. 11 shows exemplary evaluation information stored in the evaluation information storage unit 18, in accordance with one embodiment. In the evaluation information, each level is in association with a corresponding compound word, as shown in the drawing. For example, a compound word "Ôpun sôsu" (machine translation of "Open Source") is in association with the level A2 because $\beta=5{,}610>0$, $\alpha=3{,}830>1$, $\beta/\delta=0.0001305<0.0012700=AVG\times0.1$. A compound word "Gunshuu houhou" (machine translation of "Community Method") is in association with the level D because $\beta=0$. A compound word "Apurikêshon sekyuriteî mondai" (machine translation of "application security problem") is in association with the level C3 because $\beta=5{,}790>0$, $\alpha=0\leq1$, $\gamma=0\leq1$, and $\beta/\delta=0.0003688<0.0012700=AVG\times0.1$.

When the evaluation information has been stored in the evaluation information storage unit 18 in this manner, the dictionary update unit 19 registers, as the respective translated words of English compound words that have not been subjected to translation, the Japanese compound words adopted in machine translation in a dictionary in response to a request from the user based on the evaluation information.

Figure 12:
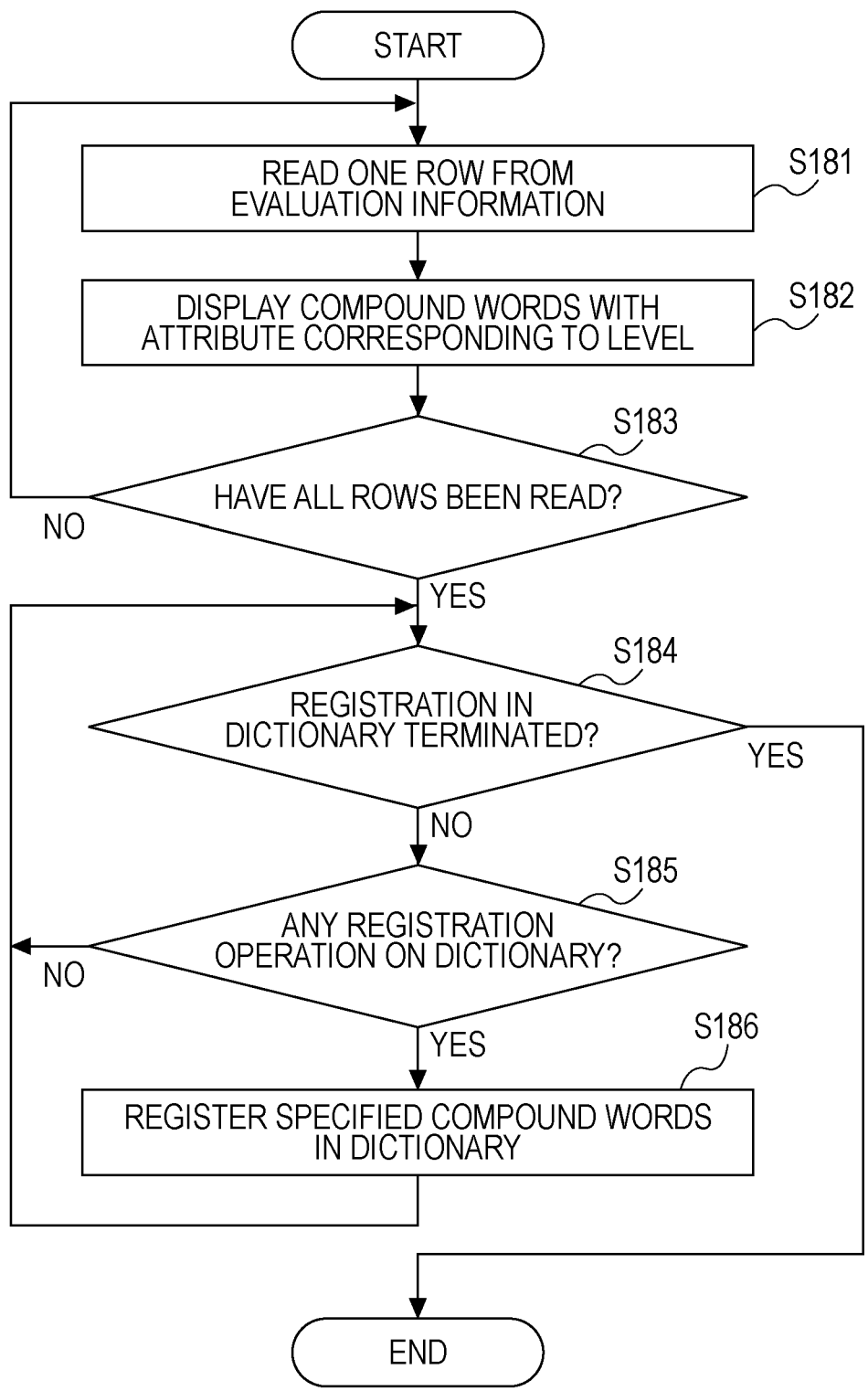
FIG. 12 is a flowchart showing an exemplary operation of a dictionary update unit in the client in the embodiment of the present invention.

FIG. 12 is a flowchart showing an exemplary operation of the dictionary update unit 19 in this case and in accordance with one embodiment. The dictionary update unit 19 first reads one row from the evaluation information stored in the evaluation information storage unit 18 (step 181). Then, compound words included in the read evaluation information are displayed, with an attribute corresponding to a level included in the read evaluation information, on the Japanese document displayed on the display unit 90*d* (refer to FIG. 13) in step 104 in FIG. 5 (step 182). In this case, for example, it is advised to use, as an attribute, a display color for displaying a compound word. Specifically, a compound word classified into the level A, a compound word classified into the level B, a compound word classified into the level C, and a compound word classified into the level D may be displayed in green, blue, yellow, and red, respectively.

Subsequently, the dictionary update unit 19 determines whether all rows have been read from the evaluation information stored in the evaluation information storage unit 18 (step 183). When all rows have not been read, processing in steps 181 to 182 is repeated. When all rows have been read, registration of the compound words in the dictionary is performed in response to a user operation based on the display of the compound words on the Japanese document.

Specifically, the dictionary update unit 19 first determines whether the user has explicitly chosen not to register compound words in the dictionary (step 184). When the user has chosen not to register compound words in the dictionary, the operation is completed. On the other hand, when the user has not chosen not to register compound words in the dictionary, it is determined whether the user has registered a specific compound word in the dictionary within a predetermined time period (step 185).

As a result, when the user has registered a specific compound word in the dictionary within the predetermined time period, the specified compound word is registered in the dictionary (step 186), and then the operation returns to step 184. On the other hand, when the user has not registered a specific compound word in the dictionary within the predetermined time period, the operation returns to step 184 without registering any compound word in the dictionary.

In the strict sense, the evaluation of a compound word described here is different from the evaluation of a compound word described with reference to FIG. 3. However, these evaluation methods overlap with each other in the concept that, in a case where an Internet search is performed using a compound word as a search key, when the number of hits at a specific site is extremely smaller than the number of hits at all sites, the compound word is not suitable as a translated word at the specific site.

As long as the concept that, when the number of hits at a specific site is extremely smaller than the number of hits at all sites, a corresponding compound word is not suitable as a translated word at the specific site, is adopted, other conditions may be variously changed. For example, in FIG. 10, when $\beta>0$ and $\alpha>1$, $\beta/\delta$ is evaluated. In this case, the condition that $\beta>0$ may be eliminated. Moreover, when $\beta>0$, $\alpha\leq1$, and $\gamma\leq1$, $\beta/\delta$ is evaluated. In this case, the conditions that $\beta>0$ and $\alpha\leq1$ may be eliminated, or the conditions that $\beta>0$ and $\gamma\leq1$ may be eliminated.

Moreover, the invention may be considered to use the value of $\beta/\delta$ to determine a level in a criterion defined with predetermined conditions. Specifically, it may be considered that a level is determines by the following method: when $\beta/\delta$ is equal to or more than a first threshold value, the level of the adequacy of a corresponding word as a translated word in a field corresponding to a specific site is a first level, and when $\beta/\delta$ is smaller than a second threshold value that is equal to or less than the first threshold value, the level of the adequacy of the word as a translated word in the field corresponding to the specific site is a second level that is lower than the first level.

In the embodiment, in this manner, a specific site and all sites are searched for pages that include a certain compound word, and the probability of mistranslation of the compound word is digitized on the basis of the number of hits at the specific site and the number of hits at all sites. Thus, priorities can be set for compound words that need to be verified regarding the adequacy of the compound words as translated words in the context of a specific site, so that the time necessary to detect compound words to be verified can be reduced greatly as compared with a case where compound words to be verified are manually detected. Moreover, although a corpus is not used, it can be determined, substantially without human intervention, whether a compound word is a mistranslated word.

In the embodiment, a compound word that is a word obtained by combining two or more words together is subjected to mistranslation detection. Alternatively, a single word that is a word that cannot be divided into subcomponents may be subjected to mistranslation detection. In this case, since there is no distinction between exactly matching and co-occurrence matching, $\alpha=\beta$ and $\gamma=\delta$. For example, it is assumed that, when a field corresponding to a specific site is related to computers, a translation engine for the specific site has adopted "kenryokusha" (which is one candidate Japanese translated word of an English word "authority") as the translated word of "authority". In this case, it can be considered that, when all sites are searched for "kenryokusha", hits are found in many pages, but when a specific site is searched for "kenryokusha", the number of hits is not so large. Thus, it is determined that "kenryokusha" is not suitable as a translated word at the specific site, and the user is prompted to perform verification, so that "osorithi" (which is another candidate Japanese translated word of an English word "authority") that is an appropriate translated word related to computers can be obtained.

Moreover, in the embodiment, pages that include a word are searched for. Alternatively, for example, pages related to a word, such as pages in which a word is registered as an index, may be searched for.

Moreover, in the embodiment, the client 10 performs morphological analysis. However, the present invention is not limited to such an embodiment. That is, a morphological analysis engine that performs morphological analysis may be provided outside of the client 10, and the client 10 may transfer a translated document to the morphological analysis engine and indicate to the morphological analysis engine to perform morphological analysis and may receive the result from the morphological analysis engine.

Moreover, in the embodiment, the client 10 indicates to the translation engine 20 provided outside of the client 10 to perform translation and indicates to the search engine 30 provided outside of the client 10 to perform search. However, the present invention is not limited to such an embodiment. Another arrangement may be adopted. In the arrangement, the client 10 performs translation and search.

Moreover, in the embodiment, a system for verifying whether a translated word adopted by the translation engine 20 connected to the intranet is suitable as a translated word in a field in which, for example, an enterprise connected to the translation engine 20 via the intranet is involved has been described. Alternatively, another arrangement may be adopted. In the arrangement, when the client 10 has inquired of a server, specifying a certain field, whether a translated word is suitable as a translated word in the field, the server performs numerical evaluation of the translated word and prompts a user to verify mistranslation.

Figure 13:
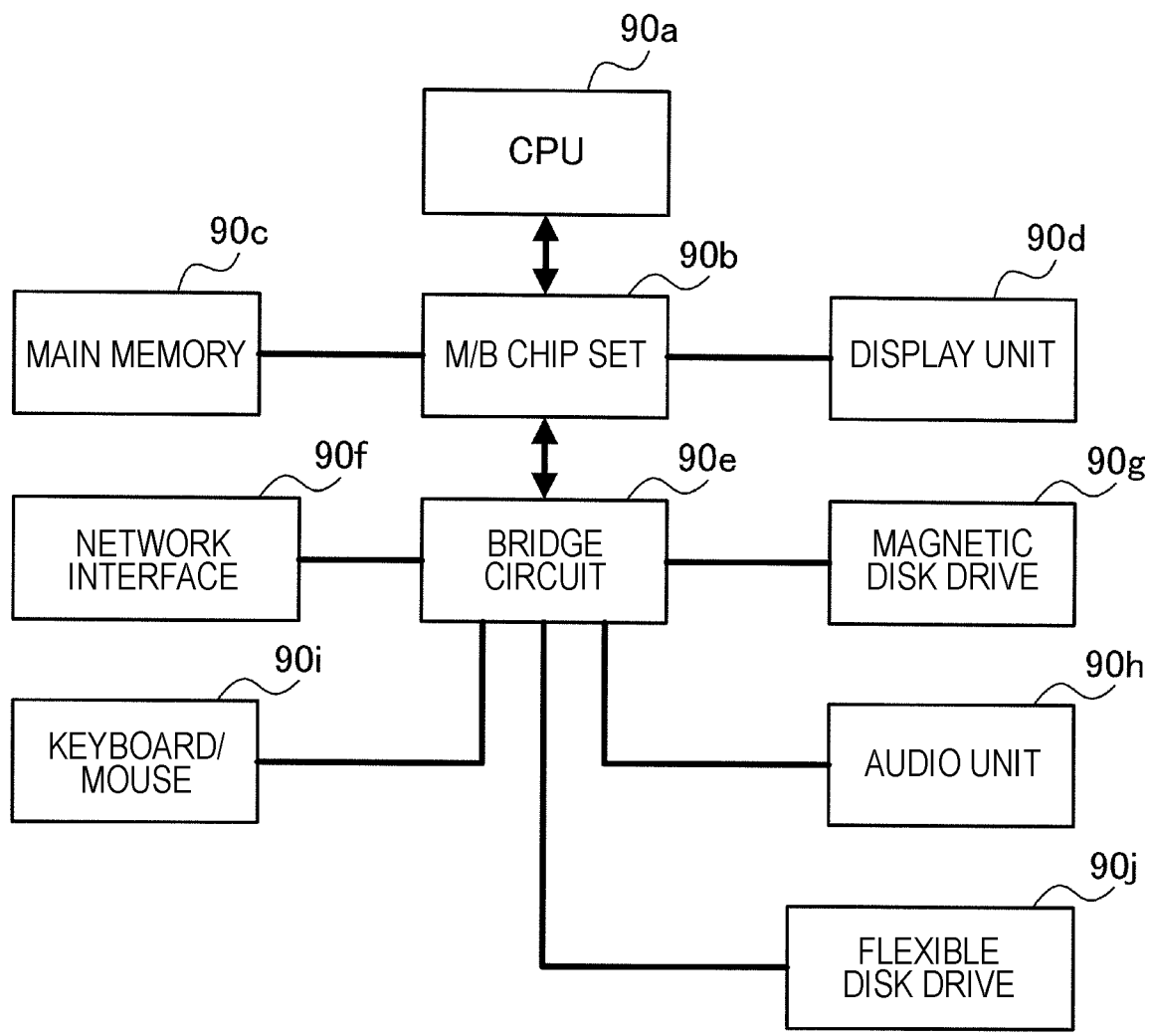
FIG. 13 is a diagram showing the hardware configuration of a computer to which the embodiment of the present invention can be applied.

Finally, the hardware configuration of a computer to which the embodiment is suitably applied will be described. FIG. 13 is a diagram showing an exemplary hardware configuration of such a computer. The computer includes a central processing unit (CPU) 90a that is calculation means, a main memory 90c connected to the CPU 90a via a mother board (M/B) chip set 90b, and a display unit 90d connected to the CPU 90a via the M/B chip set 90b, as shown in the drawing. Moreover, a network interface 90f, a magnetic disk drive (HDD) 90g, an audio unit 90h, a keyboard/mouse 90i, and a flexible disk drive 90j are connected to the M/B chip set 90b via a bridge circuit 90e.

In FIG. 13, the individual components are connected to each other via a bus. For example, connection between the CPU 90a and the M/B chip set 90b and connection between the M/B chip set 90b and the main memory 90c are established via a CPU bus. Moreover, connection between the M/B chip set 90b and the display unit 90d may be established via Accelerated Graphics Port (AGP). However, when the display unit 90d includes a video card that supports PCI Express, connection between the M/B chip set 90b and this video card is established via a PCI Express (PCIe) bus. Moreover, when connection to the bridge circuit 90e is established, regarding the network interface 90f, for example, PCI Express may be used. Moreover, regarding the magnetic disk drive 90g, for example, serial AT Attachment (ATA), ATA for parallel transfer, or Peripheral Components Interconnect (PCI) may be used. Moreover, regarding the keyboard/mouse 90i and the flexible disk drive 90j, Universal Serial Bus (USB) may be used.

While the present invention has been described using the embodiment, the technical scope of the present invention is not limited to the aforementioned embodiment. It is obvious to persons skilled in the art that various changes can be made or an alternative embodiment can be adopted without departing from the scope of the present invention.

The invention claimed is:

1. An apparatus for providing assistance in detecting mistranslation in a translated document obtained by performing machine translation of an original document, the apparatus comprising:

a processor;

a memory containing instructions that are executable by the processor;

a first acquisition unit operable to obtain a word included in the translated document;

a second acquisition unit operable to obtain a first value representing the search results of performing a web search of a first document data group and a second value representing the search results of performing a web search of a second document data group including the first document data group for pieces of document data related to the word obtained by the first acquisition unit, wherein the first document data group is obtained from a specific website known to be relevant in a subject matter field for the obtained word, and wherein the second document data group is obtained through a general web search;

a generation unit operable to generate, based on a comparison of the ratio of the first value and the second value with a predetermined threshold value, an index indicating adequacy of the word obtained by the first acquisition unit as a translated word in a subject matter field corresponding to the first document data group; and an output unit operable to output the index generated by the generation unit, wherein the processor is operable to execute instructions stored in the memory to coordinate the actions performed by the first acquisition unit, the second acquisition unit, the generation unit and the output unit.

2. The apparatus according to claim 1, wherein:

when a ratio of the first value to the second value is equal to or less than the predetermined threshold value, the generation unit is operable to generate the index, which indicates that the word obtained by the first acquisition unit is not suitable as a translated word in the field corresponding to the first document data group.

3. The apparatus according to claim 1, wherein the second acquisition unit is operable to:

obtain a search result of searching the first document data group for pieces of document data related to the word by automatically generating a first search query that includes specification of the first document data group and the word and inputting the first search query to a search engine, and obtain a search result of searching the second document data group for pieces of document data related to the word by automatically generating a second search query that does not include specification of the first document data group and that includes the word and inputting the second search query to the search engine.

4. The apparatus according to claim 1, wherein:

the first acquisition unit is operable to obtain, as the word, a compound word that includes a plurality of constituent words, and the second acquisition unit is operable to obtain the search results of searching both the first document data group and the second document data group for pieces of document data that include the plurality of constituent words as the pieces of document data related to the word.

5. The apparatus according to claim 4, wherein:
the second acquisition unit is operable to obtain, as the search results, a first value indicating a number of pieces of document data that include the plurality of constituent words in the first document data group and a second value indicating a number of pieces of document data that include the plurality of constituent words in the second document data group, and
the generation unit is operable to generate the index on the basis of a result of comparing the first value with the second value.

6. The apparatus according to claim 5, wherein:
when a ratio of the first value to the second value is equal to or more than a first threshold value, the generation unit is operable to generate the index, which indicates that a level of adequacy of the compound word obtained by the first acquisition unit as a translated word in the field corresponding to the first document data group is a first level, and
when the ratio is smaller than a second threshold value that is equal to or less than the first threshold value, the generation unit is operable to generate the index, which indicates that the level of the adequacy of the compound word as a translated word in the field corresponding to the first document data group is a second level that is lower than the first level.

7. The apparatus according to claim 5, wherein:
the second acquisition unit is further operable to obtain a third value indicating a number of pieces of document data that include the compound word, the number being obtained by searching the first document data group for the pieces of document data, and
the generation unit is operable to generate the index further on the basis of a result of comparing the third value with a third threshold value.

8. The apparatus according to claim 5, wherein:
the second acquisition unit is further operable to obtain a fourth value indicating a number of pieces of document data that include the compound word, the number being obtained by searching the second document data group for the pieces of document data, and
the generation unit is operable to generate the index further on the basis of a result of comparing the fourth value with a fourth threshold value.

9. A computer-implemented method for providing assistance in detecting mistranslation in a translated document obtained by performing machine translation of an original document, the method comprising:
obtaining a word included in the translated document;
obtaining a first value representing the search results of performing a web search of a first document data group and a second value representing the search results of performing a web search of a second document data group including the first document data group for pieces of document data related to the word obtained by the first acquisition unit, wherein the first document data group is obtained from a specific website known to be relevant in a subject matter field for the obtained word, and wherein the second document data group is obtained through a general web search;
generating, based on a comparison of the ratio of the first value and the second value with a predetermined threshold value, an index indicating adequacy of the obtained word as a translated word in a subject matter field corresponding to the first document data group; and
outputting the generated index.

10. The method according to claim 9, wherein generating the index includes:
generating the index when a ratio of the first value to the second value is equal to or less than a predetermined threshold value, the index indicating that the word obtained by the first acquisition unit is not suitable as a translated word in the field corresponding to the first document data group.

11. The method according to claim 9, wherein obtaining search results includes:
obtaining a search result of searching the first document data group for pieces of document data related to the word by automatically generating a first search query that includes specification of the first document data group and the word and inputting the first search query to a search engine,
obtaining a search result of searching the second document data group for pieces of document data related to the word by automatically generating a second search query that does not include specification of the first document data group and includes the word, and
inputting the second search query to the search engine.

12. The method according to claim 9, wherein:
obtaining a word includes obtaining a compound word that includes a plurality of constituent words, and
obtaining search results includes obtaining the search results of searching both the first document data group and the second document data group for pieces of document data that include the plurality of constituent words as the pieces of document data related to the word.

13. A computer program product for providing assistance in detecting mistranslation in a translated document obtained by performing machine translation of an original document, the computer program product comprising:
a computer readable storage medium having computer readable program code embodied therewith, the computer readable program code comprising:
computer readable program code configured to obtain a word included in the translated document;
computer readable program code configured to obtain a first value representing the search results of performing a web search of a first document data group and a second value representing the search results of performing a web search of a second document data group including the first document data group for pieces of document data related to the word obtained by the first acquisition unit, wherein the first document data group is obtained from a specific website known to be relevant in a subject matter field for the obtained word, and wherein the second document data group is obtained through a general web search;
computer readable program code configured to generate, based on a comparison of the ratio of the first value and the second value with a predetermined threshold value, an index indicating adequacy of the obtained word as a translated word in a subject matter field corresponding to the first document data group; and
computer readable program code configured to output the generated index.

14. The computer program product according to claim 13, wherein the computer readable program code configured to generate the index includes:
computer readable program code configured to generate the index when a ratio of the first value to the second value is equal to or less than a predetermined threshold value, the index indicating that the word obtained by the first acquisition unit is not suitable as a translated word in the field corresponding to the first document data group.

15. The computer program product according to claim 13, wherein the computer readable program code configured to obtain search results includes:

computer readable program code configured to obtain a search result of searching the first document data group for pieces of document data related to the word by automatically generating a first search query that includes specification of the first document data group and the word and inputting the first search query to a search engine, computer readable program code configured to obtain a search result of searching the second document data group for pieces of document data related to the word by automatically generating a second search query that does not include specification of the first document data group and includes the word, and computer readable program code configured to input the second search query to the search engine.

16. The computer program product according to claim 13, wherein:

the computer readable program code configured to obtain a word includes computer readable program code configured to obtain a compound word that includes a plurality of constituent words, and the computer readable program code configured to obtain search results includes computer readable program code configured to obtain the search results of searching both the first document data group and the second document data group for pieces of document data that include the plurality of constituent words as the pieces of document data related to the word.

* * * * *